Patented May 3, 1949

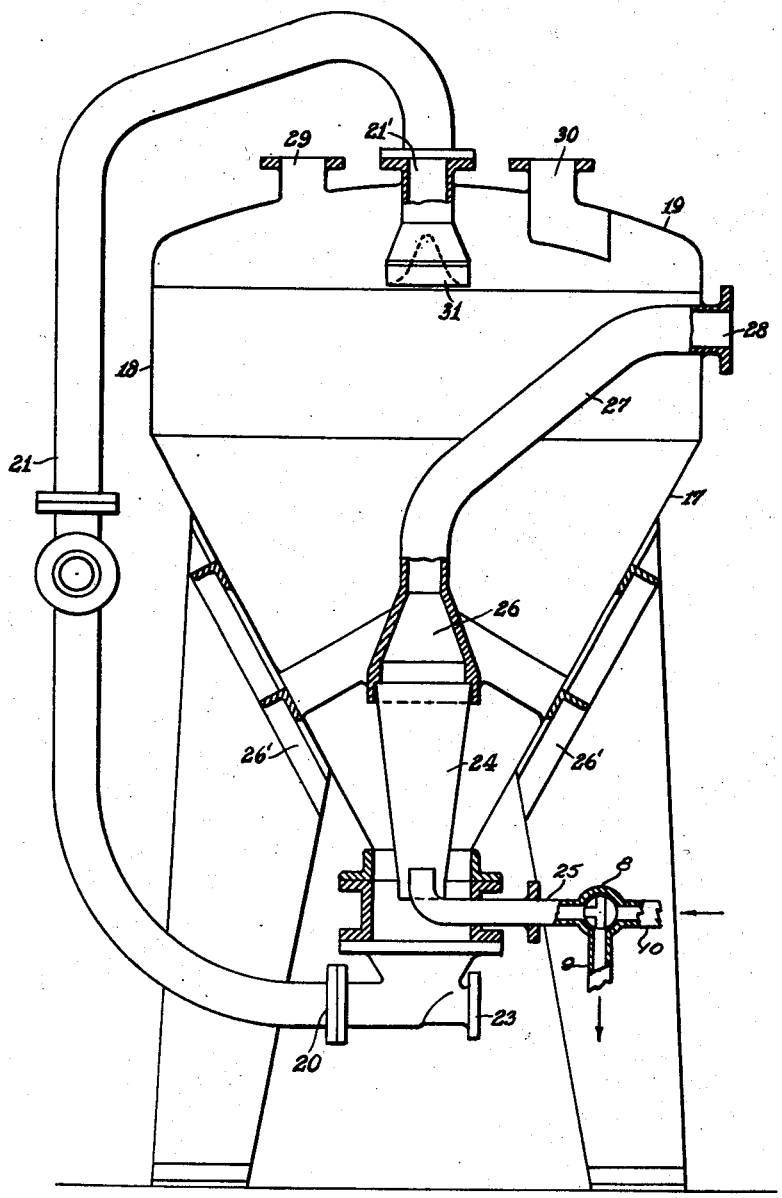

2,468,838

UNITED STATES PATENT OFFICE 2,468,838

FILTERING APPARATUS

Augustin Rey, Paris, France, assignor to Comptoir des Textiles Artificiels, Paris, France, a corporation of the Republic of France Application July 31, 1947, Serial No. 764,973
In France February 20, 1941

1 Claim. (Cl. 210—141)

This invention relates to filtering apparatus. More particularly, it relates to a new and improved filtering apparatus wherein the filtering medium, which consists of a bed of granulated substances, is periodically regenerated, i. e. freed from the solid substances removed from the liquid to be filtered and re-formed into the filtering bed.

In a known type of filtering apparatus, a filtering medium in the form of a bed of granules was formed and disposed on a conical support which constituted a double bottom in a cylindrical tank provided with a dome at the top thereof and a bulged (concave) bottom. Due to this arrangement, there was formed between the conical support and the tank a chamber into which the filtrate was received. An outlet in the bottom of the tank was provided to permit the filtrate to be discharged from said chamber. An inlet in the dome permitted the liquid to be filtered into the apparatus. The bottom of the conical support was connected to an ejector which, in turn, was connected by a line to a distributor disposed in the upper portion of the tank. When the filter bed became clogged, it was raised by circulating a washing liquid upwardly through the apparatus. Water under strong pressure was then supplied into the ejector and the granules of the filtering bed were sucked downwardly and carried through the conduit to the distributor, from which they dropped onto the conical support. A deflector was provided to distribute the granules on the support.

The above-described apparatus was unsatisfactory for the reason that only part of the bed, i. e. the central portion thereof, was withdrawn and regenerated. As a consequence, the bed was only partially cleansed. Due to the design of the distributor and deflector, the cleansed granules were not uniformly distributed in the bed. Additionally, the perforations of the conical member became clogged and even permitted some of the granules of the filter bed to pass therethrough. The complicated design of the aforementioned apparatus necessitated a construction from easily machined material, such as lead, but it did not permit the apparatus and particularly the cylindrical tank and cone to be made of ebonite.

An object of this invention is to provide a new and improved filtering apparatus.

Another object of this invention is to provide a simple filtering apparatus wherein the filtering bed, formed of granulated material, can be wholly regenerated and reformed.

Other and additional objects will become apparent hereinafter.

The invention will be more clearly understood by reference to the following detailed description when taken in connection with the accompanying drawing, wherein the single figure is a vertical section of a filtering apparatus embodying the principles of the invention.

Referring now to the drawing, the reference numeral 17 designates a conical tank in which the wall thereon converges in the downward direction. The filter bed is in the conical tank 17, which is provided at the top thereof with a cylindrical portion 18 carrying a dome 19. In the lower portion and centrally of the conical tank 17, there is provided a perforated barrel 24 which is carried and centered between an inlet 25 at the bottom thereof and a coupling 26 at the top thereof. The inlet 25 is connected through a three-way valve 8 to a drain pipe 9 and a supply pipe 10 for backwash water. The coupling 26 connects the barrel 24 to an outlet tube 27 and is supported by arms 26' carried by the conical tank 17. The outlet tube 27 is connected to an outlet 28 (in the conical tank 17) which, in turn, is connected to a pipe (not shown) which, as will hereinafter appear, conducts the filtered liquid to a suitable storage supply.

The wall of the barrel 24 flares in an upward direction and is in spaced relationship to the wall of the conical tank 17. The filter bed is formed in the angular space between the barrel 24 and the wall of the conical tank 17. The filter bed is outwardly supported by the cylindrical end portion of the tank 17 and at the bottom it rests on the ejector 23.

An ejector 23, which is connected to the bottom of the conical tank 17, is also connected through the outlet 20 to an external conduit 21 which, in turn, is connected to an inlet 21' in the dome 19. A distributor 31 in the tank is connected to the inlet 21'. The dome 19 is also provided with an inlet 30 whereby the liquid to be filtered can be introduced into the apparatus under pressure. The dome 19 is also provided with an outlet 29 for reasons which will become apparent hereinafter.

In operation, the liquid to be filtered is supplied under pressure from a suitable source of supply to the apparatus through the inlet 30. The liquid passes through the filter bed into the perforated barrel 24, from which it is discharged from the apparatus through the tube 27 and the outlet 28, which is appropriately connected to a reservoir. When the filter bed becomes clogged or choked, the supply is discontinued and the apparatus is emptied through the outlet 25. After the apparatus has been emptied, liquid under pressure is introduced through the outlet 25 so that the filter bed is raised, the liquid passing from the apparatus through the outlet 29. After the filter bed has been raised, water under pressure is fed through the ejector 23 which produces a suction effect in the conical tank 17, with the result that the granules of the filter bed are withdrawn therefrom and carried through the line 21 to the distributor 31, from which the granules are re-introduced into the apparatus. The granules delivered by the head form the bed between the barrel 24 and the wall of the conical tank.

It is to be understood that the various inlets and outlets are provided with valves which are opened or closed as necessary to carry out the desired operations.

The design of the filtering apparatus of this invention permits it to be formed of cheaper and stronger materials than previously used. The tank can be made from ebonite sheeting, and the barrel can be made of stainless steel sheeting perforated by long and narrow slits or sheeting with large holes covered by a sleeve of wire gauge, such as stainless steel, nickel wire, or the like. The annular arrangement of the filtering bed insures its complete circulation on re-constituting the bed.

The filter bed can be formed of any granular substance, such as quartz, sand, coke, etc., and preferably is formed in the annular space between the barrel and wall of the conical tank. If desired, the bed can extend above the top of the barrel 24.

The apparatus can be used for the filtering of highly corrosive liquids, such as viscose spinning baths. It can also be used for the clarification of liquids of low or medium viscosity containing only small quantities of insoluble substances, such as beer, fruit juice, syrup, etc.

Since it is obvious that various changes and modifications can be made in the above description without departing from the nature or spirit thereof, this invention is not restricted thereto except as set forth in the appended claim.

I claim:

A filtering apparatus comprising a conical tank, means to supply the liquid to be filtered to the upper part of said tank, a perforated barrel disposed coaxially with and in spaced relationship to the wall of said tank to provide an annular chamber therebetween, a filter bed disposed in said chamber whereby the liquid in said tank will pass through said bed into said barrel, a duct to discharge the filtrate connected to the top of said barrel, a duct for emptying said tank and having means for admitting backwash water connected to the bottom of said barrel, an outlet for backwash water at the upper part of said tank above said filter bed, an ejector connected to the bottom of said tank, a distributor in the upper portion of said tank, and means connecting said ejector to said distributor for the withdrawal of the bed and the reintroduction thereof into said tank.

AUGUSTIN REY.

REFERENCES CITED

The following references are of record in the file of this patent:

UNITED STATES PATENTS

| Number | Name | Date |
|---|---|---|
| 395,070 | Moore | Dec. 25, 1888 |
| 579,039 | Brashear | Mar. 16, 1897 |
| 1,130,382 | Deacon et al. | Mar. 2, 1915 |
| 1,620,431 | Bramwell | Mar. 8, 1927 |
| 1,861,295 | Bramwell | May 31, 1932 |